(12) United States Patent
Takagi

(10) Patent No.: US 6,334,826 B1
(45) Date of Patent: Jan. 1, 2002

(54) V BELT TYPE AUTOMATIC TRANSMISSION

(75) Inventor: Izumi Takagi, Akashi (JP)

(73) Assignee: Kawasaki Jukogyo Kabushiki Kaisha, Kobe (JP)

( * ) Notice: Subject to any disclaimer, the term of this patent is extended or adjusted under 35 U.S.C. 154(b) by 0 days.

(21) Appl. No.: 09/500,987

(22) Filed: Feb. 15, 2000

(30) Foreign Application Priority Data

Feb. 15, 1999 (JP) .................................. 11-035857

(51) Int. Cl.⁷ ............................ F16H 59/00; F16H 61/00; F16H 63/00
(52) U.S. Cl. .................................. 474/14; 474/12
(58) Field of Search ................... 474/14, 25, 29, 474/12, 17

(56) References Cited

U.S. PATENT DOCUMENTS 4,515,575 A * 5/1985 Kinbara et al. ................ 474/13

FOREIGN PATENT DOCUMENTS

| JP | 3-14957 | 1/1991 |
| JP | 9-317836 | 12/1997 |
| SU | 622755 | * 8/1978 |
| SU | 624859 | * 8/1978 |

* cited by examiner

Primary Examiner—Sherry Estremsky
Assistant Examiner—Tisha D. Lewis
(74) Attorney, Agent, or Firm—Oliff & Berridge, PLC

(57) ABSTRACT

In a V belt type automatic transmission, circumferential gaps between the movable sheave part of a driving sheave and a spider is maintained constant so that the backlash between the movable sheave part and the spider is substantially zero to prevent the generation of hammering noise or to reduce the abrasion of bushings, and to maintain the ability of the movable sheave part to move axially. Guide shoes (40, 45) for guiding the movable sheave part (11) for axial sliding movement are placed in circumferential gaps between the circumference side surfaces 36 and 37 of each of the arms of a spider (15) and the guiding surfaces (32a, 32b) of each of the guiding projections (32) of the movable sheave part (11). At least one guide shoe (45) among the guide shoes (40, 45) has the shape of a wedge. The wedge-shaped guide shoe (45) is turned radially outward by centrifugal force to reduce the circumferential gap substantially to a naught. Consequently, the V belt type automatic transmission does not generate hammering noise when torque varies.

11 Claims, 5 Drawing Sheets

V BELT TYPE AUTOMATIC TRANSMISSION

BACKGROUND OF THE INVENTION

1. Field of the Invention

The present invention relates to a V belt type automatic transmission including a driving sheave mounted on a driving shaft, a driven sheave mounted on a driven shaft, a V belt extended between the driving sheave and the driven sheave, a thrust generating mechanism mounted on the driving shaft to produce a thrust for axially shifting an axially movable sheave part of the driving sheave to change the effective diameter of the driving sheave for automatic speed change.

2. Description of the Related Art

V belt type automatic transmissions are continuously-variable-speed transmissions used on four-wheel motor cars, such as all-terrain vehicles, motor scooters, and industrial vehicles including carriers. V belt type automatic transmissions are commonly called belt converters.

FIG. 7 shows a general power transmitting mechanism for vehicles, employing a V belt type automatic transmission. The V belt type automatic transmission includes a driving shaft 1 coupled with the crankshaft 7 of a prime mover (engine) 6, and a driven shaft 2 coupled with he input shaft of a gear transmission G. A driving sheave 3 and a driving sheave thrusting mechanism 19 are mounted on the driving shaft 1. A driven sheave 4 is mounted on the driven shaft 2. Driving sheave 3 has a fixed sheave part 10 mounted on the driving shaft 1 and is restrained from axial and rotational movement and a movable sheave part 11 mounted on the driving shaft for axial movement. The driving sheave thrusting mechanism 19 includes flyweights 16 supported for turning on the back surface of the movable sheave part 11, a pressure applying spring 20 biasing the movable sheave part 11 axially away from the fixed sheave part 10, and a spider 15 in engagement with a guiding projections 32 formed on the back surface of the movable sheave part 11 to transmit the torque of the driving shaft 1 to the movable sheave part 11 and to guide the movable sheave part 11 for axial movement.

The movable sheave part 11 is formed integrally with the guiding projections 32 and a cover 21. The cover 21 is stopped through a bearing 65 by a maximum driving sheave width adjusting mechanism 38 disposed on the right side, as viewed in FIG. 7, of the cover 21.

In this V belt type automatic transmission, the rotating speed of the driving sheave 3 varies delicately according to the variation of the torque of the prime mover 6 and, consequently, the guiding projections 32 of the movable sheave part 11 vibrate circumferentially relative to the spider 15 and strike against the spider 15 to generate hammering noise. Generally, such hammering noise can be reduced by accurately finishing the circumferentially opposite surfaces of the guiding projections 32 and the spider 15 so that gaps between the same circumferentially opposite surfaces are small. More positive measures use guide shoes 40 as shown in FIG. 8. FIG. 8 is a view taken along the direction of the arrow VIII in FIG. 7 and showing the engagement of the spider 15 and the guiding projections 32 of the movable sheave part 11 (FIG. 7). Guide shoes 40 each provided with a rubber layer 47 are interposed between the circumferentially opposite side surfaces 36 and 37 of the spider and the guide surfaces 32a and 32b of the guiding projections 32 on the opposite sides of the spider 15, respectively. The guide shoes 40 are able to slide axially along the guide surfaces 32a and 32b, and the rubber layers 47 eases impact resulting from the variation of the torque to reduce the hammering noise.

The reduction of the circumferential gaps between the spider and the guiding projections is limited because the guiding projections and the spider must slide axially relative to each other and it is difficult to reduce the hammering noise effectively by reducing backlashes to about zero.

Even if the shocks are eased by using the guide shoes 40 provided with the rubber layers 47, generation of hammering noise, though very light, is unavoidable because displacement of parts is unavoidable because the rubber layers 47 are inevitably subject to elastic deformation. Since the rubber layers 47 of the guide shoes 40 are permanently set in fatigue and the sliding surfaces of the guide shoes 40 are abraded during a long period of use and, consequently, hammering noise increases gradually with operating time.

The displacement of parts due to the elastic deformation of the rubber layers 47 promotes abrasion of the following parts in addition to the generation of hammering noise.

Parts that are abraded will be described with reference to FIG. 1 showing a V belt type automatic transmission according to the present invention. Parts that will be abraded are (1) a bushing 13 fitted in the bore of a movable sheave part 11, (2) a bushing 35 supporting a cover 21 formed integrally with the movable sheave part 11, (3) bushings 26 supporting flyweights 16, (4) bushings 29 supporting rollers 17 against which the flyweights 16 are pressed and (5) the contact surfaces of the flyweights 16 and the rollers 17. Related techniques are disclosed in JP-A No. Hei 9-317836.

SUMMARY OF THE INVENTION

It is an object of the present invention to eliminate the circumferential gaps to stop the hammering noise, maintaining the smooth axial movement of the movable sheave part relative to the spider by properly designing the shape of the guide shoes placed in the circumferential gaps between the movable sheave part of the driving sheave and the spider and to suppress the abrasion of the aforesaid parts.

To solve the problems, the present invention provides a V belt type automatic transmission comprising: a driving sheave mounted on a driving shaft and including a fixed sheave part mounted on the driving shaft and restrained from axial movement and turning relative to the driving shaft, and a movable sheave part mounted on the driving shaft for axial movement; a driven sheave mounted on a driven shaft; a V belt extended between the driving sheave and the driven sheave; and a thrust generating mechanism mounted on the driving shaft to produce a thrust for axially shifting the movable sheave part of the driving sheave, including flyweights supported for turning on the movable sheave part, and a spider having parts in contact with the flyweights, mounted on the driving shaft and restrained from axial movement and turning relative to the driving shaft; wherein guide shoes are disposed in circumferential gaps between the spider and the movable sheave part to guide the movable sheave part for axial movement relative to the spider, and the guide shoes have the shape of a wedge.

According to the present invention, the spider is provided with recesses for receiving the wedge-shaped guide shoes to hold the wedge-shaped guide shoes on the spider.

According to the present invention, the wedge-shaped guide shoes are biased radially outward with auxiliary biasing means, such as springs.

DESCRIPTION OF THE PREFERRED EMBODIMENTS

Figure 1:
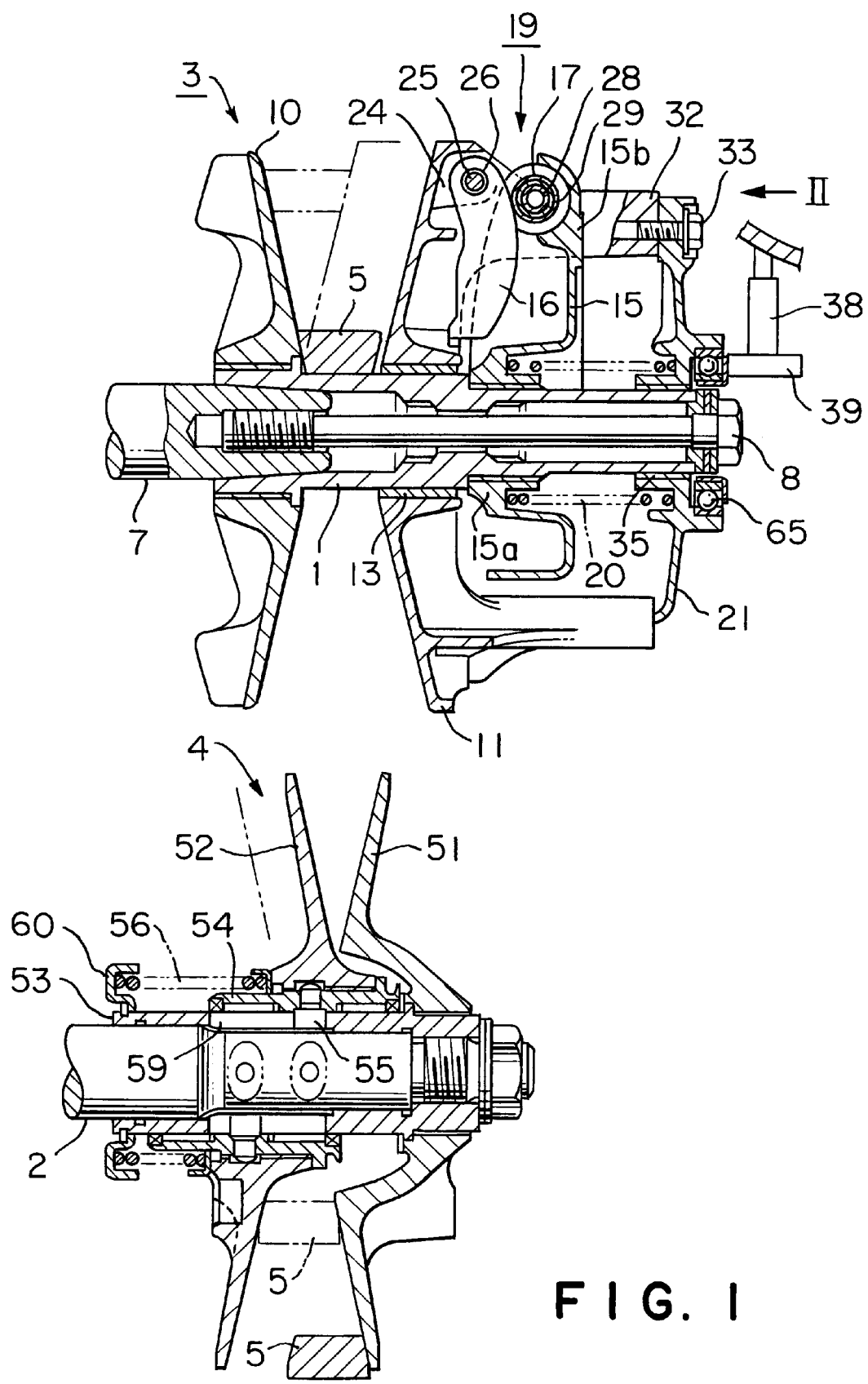
FIG. 1 is a longitudinal sectional view of a V belt type automatic transmission in a preferred embodiment according to the present invention.
Figure 7:
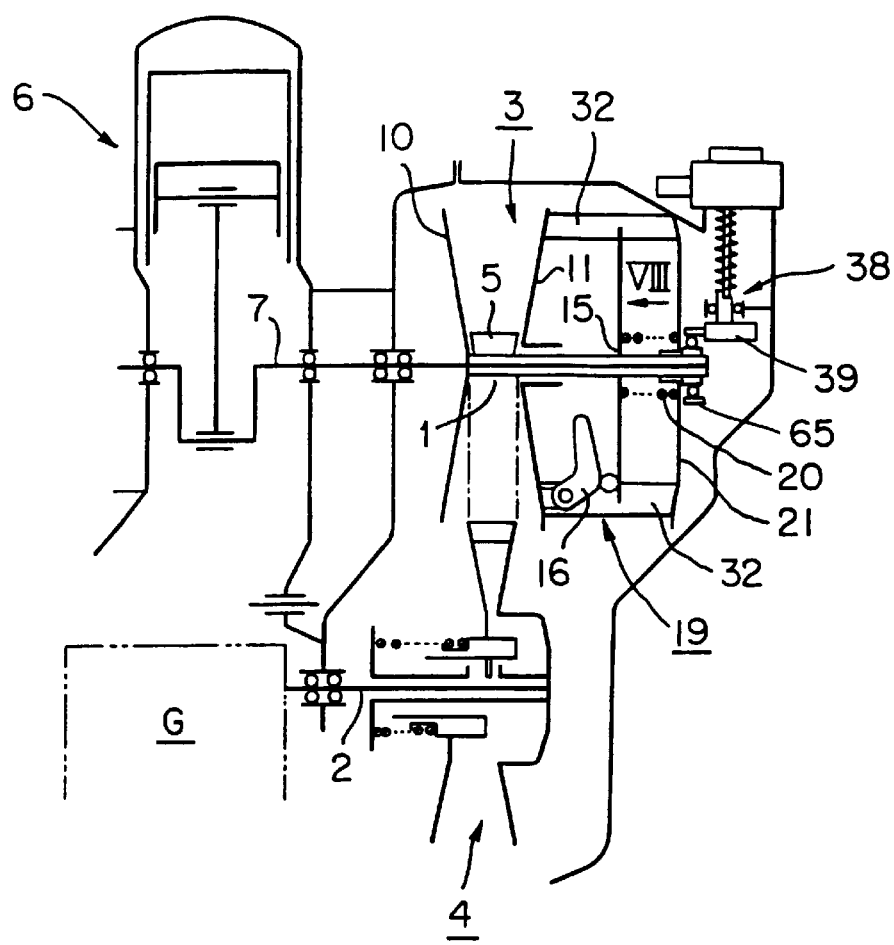
FIG. 7 is a diagrammatic view of a power transmitting system of a general V belt type automatic transmission.

FIG. 1 is a longitudinal sectional view of a V belt type automatic transmission in a preferred embodiment according to the present invention. The basic construction of the V belt type automatic transmission shown in FIG. 1 is the same as that previously described with reference to FIG. 7. In FIG. 1 parts like or corresponding to those shown in FIG. 7 are denoted by the same reference characters and the description thereof will be omitted. In the following description, it is assumed that parts on the side of a crankshaft with respect to an axial direction are those on the left side.

The V belt type automatic transmission includes a driving shaft 1, a driven shaft 2, a driving sheave 3, a driven sheave 4 and a V belt 5 extended between the sheaves 3 and 4. The driving shaft 1 has a left end part fitted on a tapered right end part of a crankshaft 7 and is fastened to the crankshaft 7 with a fastening bolt 8. The driving sheave 3 has a fixed sheave part 10 disposed on the left side (on the side of the crankshaft) and a movable part 11 disposed opposite to the fixed sheave part 10 on the axially right side of the fixed sheave part 10. The fixed sheave part 10 is screwed on the driving shaft 1 so as to be fixed with respect to circumferential and axial directions. The movable sheave part 11 is supported by a bushing 13 on the driving shaft 1 so as to be axially movable. The movable sheave part 11 is driven for rotation by the torque of the driving shaft 1 transmitted thereto through a spider 15 and guiding projections 32.

A driving sheave thrusting mechanism 19 is disposed on the back side (right side) of the movable sheave part 11. The driving sheave thrusting mechanism 19 includes a plurality of flyweights 16, a plurality of rollers (contact members) 17 in contact with the flyweights 16, the spider 15 supporting the rollers 17, a pressure applying spring 20 for biasing the movable sheave part 11 away from the fixed sheave part 10, and a cover 21 formed integrally with the spider 15.

A radially outer part of each flyweight 16 is supported for turning on a bushing 26 put on a pin 25 supported on a pair of brackets 24 projecting from the back surface of the movable sheave part 11. The flyweights 16 are turned counterclockwise, as viewed in FIG. 1, on the pins 25 from a position shown in FIG. 1 by centrifugal force. The pairs of brackets 24 are formed at a plurality of positions, such as four positions, separated at equal angular intervals, and the flyweights 16 are supported on the pairs of brackets 24, respectively.

The spider 15 is disposed on the right side of the movable sheave part 11 and has a boss 15a, and four arms 15b arranged at equal angular intervals and radially extending from the boss 15a. The boss 15a is screwed on the driving shaft 1 and is restrained from axial movement and turning relative to the driving shaft 1. A pressure pin 28 is supported on each arm 15b, a bushing 29 is put on the pressure pin 28, and the roller 17 is supported for rotation on the bushing 29. The flyweights 16 come into contact with the rollers 17 from the left side, as viewed in FIG. 1. Pairs of guiding projections 32 are formed on the back surface of the movable sheave part 11 at positions substantially corresponding to the pairs of the brackets 24. Each pair of guiding projections 32 are formed so as to lie on the circumferentially opposite sides of the arm 15b of the spider 15 with clearances between the guiding projections 32 and the arm 15b of the spider 15. The guiding projections 32 extend axially on the opposite sides of the spider 15 and are fastened to the cover 21 with bolts 33. Thus, the movable sheave part 11 and the cover 21 rotate together and move axially together relative to the driving shaft 1.

The cover 21 is put on a bushing 35 so as to be axially movable and rotatable relative to the driving shaft 1. A bearing 65 is fitted in a hole formed in a right end part of the cover 21. An operating cam 39 included in a maximum driving sheave width adjusting mechanism 38 is set in contact with the bearing 65 to adjust an axially outermost position of the cover 21.

Figure 2:
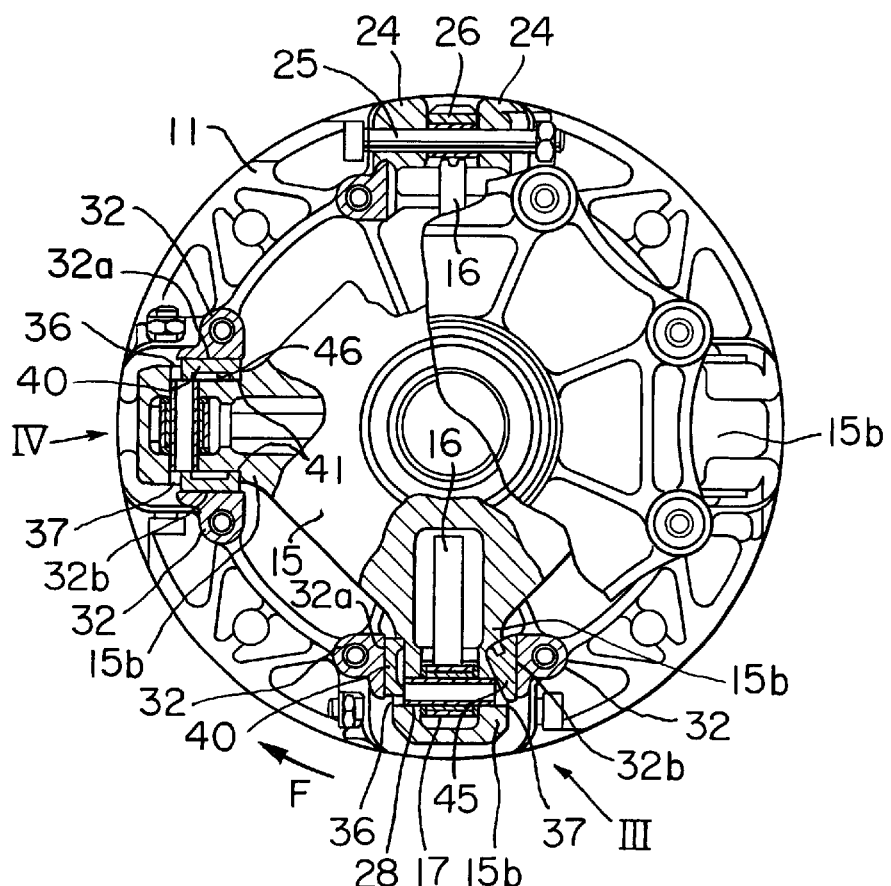
FIG. 2 is a partially cutaway view of the V belt type automatic transmission shown in FIG. 1 taken in the direction of the arrow II.
Figure 4:
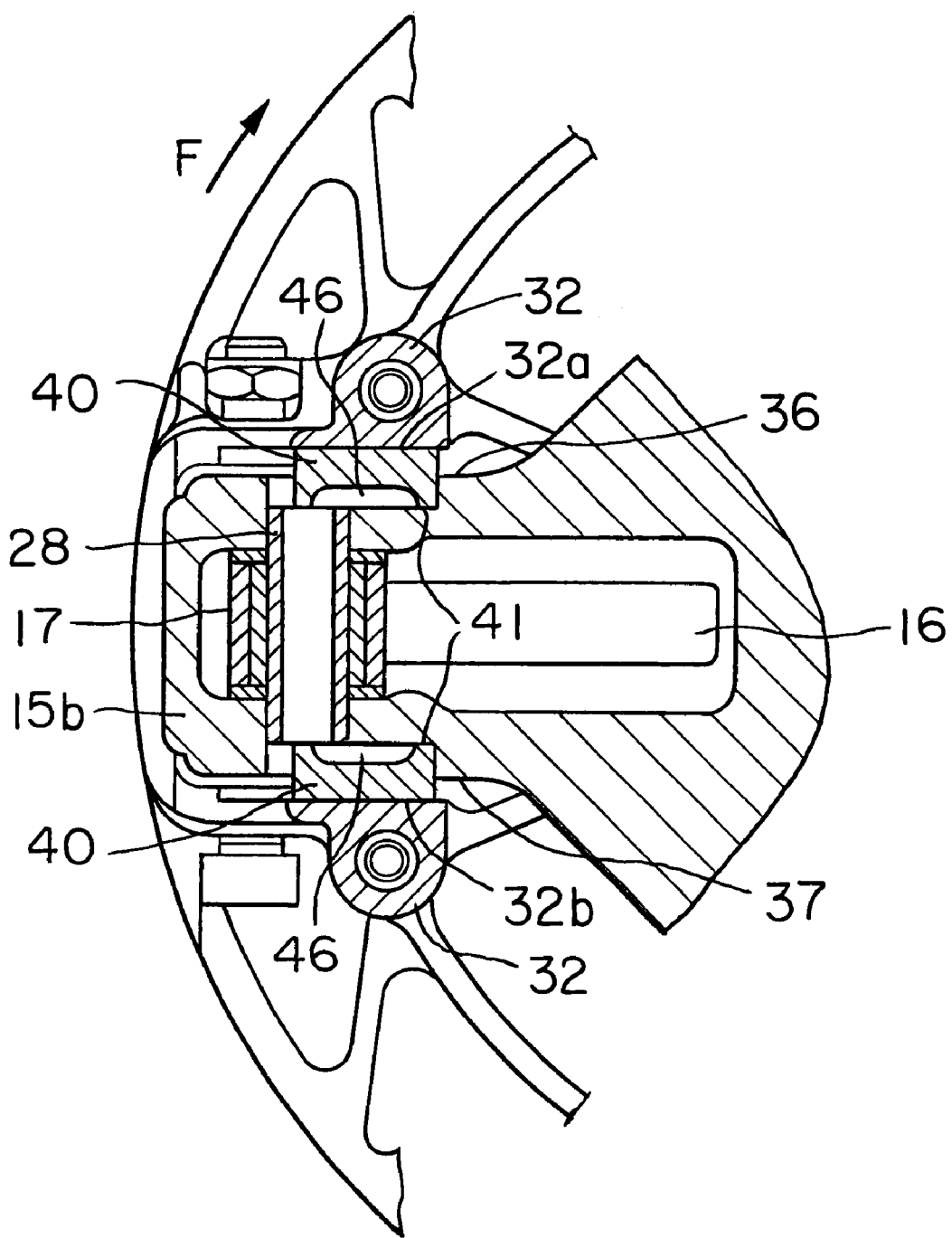
FIG. 4 is an enlarged view indicated by the arrow IV in FIG. 2.
Figure 8:
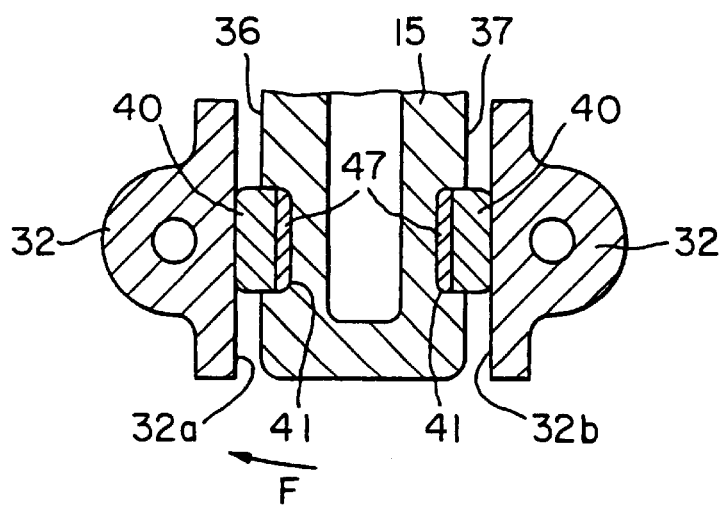
FIG. 8 is a fragmentary sectional view of engaging parts of a movable sheave part and a spider shown in FIG. 7 taken in the direction of the arrow VIII.

FIG. 2 is a partially cutaway view taken in the direction of the arrow II in FIG. 1. Referring to FIGS. 2 and 4, cylindrical guide shoes 40 of a resin substantially similar to those of the prior art shown in FIG. 8 are disposed between the opposite side surfaces 36 and 37 with respect to a circumferential direction of the two arms 15b extending in opposite directions from the center of rotation, i.e., the horizontal arms 15b in FIG. 2) among the four arms 15b of the spider 15, and the guide surfaces 32a and 32b of the guiding projections 32. The guide shoes 40 are fitted in recesses 41 having a circular cross section (circular as viewed along the axis of the pressure pin 28) and formed in the circumferentially opposite side surfaces 36 and 37 of the arm 15b. A cut 46 is formed in a portion of the surface of the guide shoe 40 in contact with the bottom surface of the recess 41 by cutting the portion of the surface to facilitate absorbing impacts. End surfaces of the guide shoes 40 opposite the surfaces on the side of the recesses 41 are in sliding contact with the guide surfaces 32a and 32b of the guiding projections 32. A rubber layer 47 as shown in FIG. 8 may be formed on the guide shoe 40 instead of forming the cut 46 therein.

Figure 3:
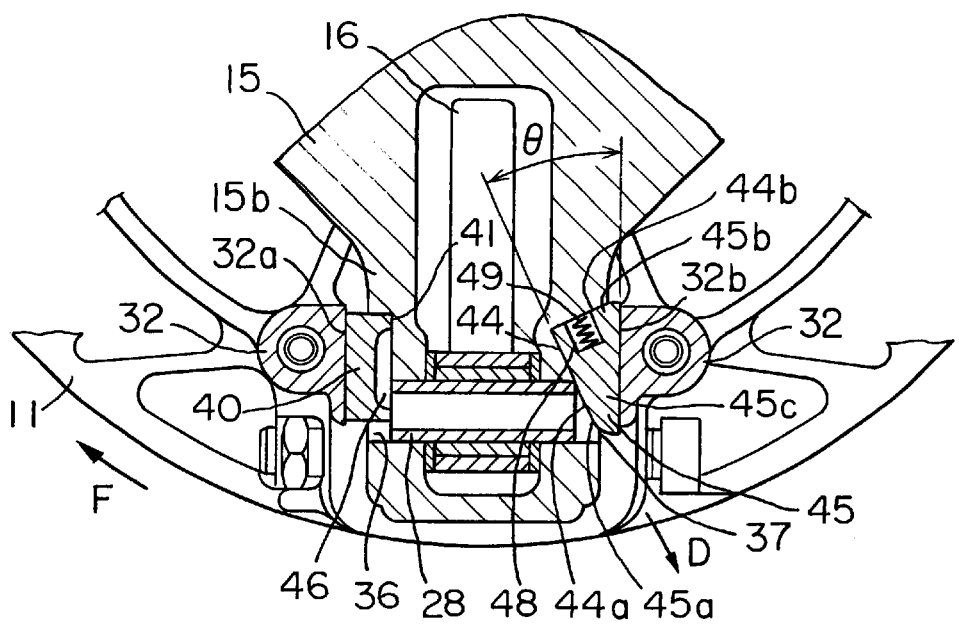
FIG. 3 is an enlarged view of a part indicated by the arrow III in FIG. 2

As shown in FIG. 3, a cylindrical guide shoe 40 is disposed in a forward gap with respect to a rotating direction F between the side surface 36 of each of the other two arms 15b, i.e., the vertical arms 15b as viewed in FIG. 2, and the guide surface 32a of the guiding projection 32, and a wedge-shaped guide shoe 45 is disposed in a back gap with respect to the rotating direction F between the side surface 37 of each arm 15b and the guide surface 32b of the guiding projection 32. The forward side surfaces of the arms 15b with respect to the rotating direction F through which torque is transmitted to the movable sheave part 11 will be called "operating side surfaces", and the other side surfaces of the same will be called "nonoperating side surfaces".

The guide shoe 40 on the side of the operating side surface 36 is fitted in a recess 41 formed in the operating side surface 36 of the arm 15b and having a circular cross section (circular when viewed along the axis of the pressure pin 28). A cut 46 is formed in a portion of the surface of the guide shoe 40 in contact with the bottom surface of the recess 41 by cutting the portion of the surface to facilitate absorbing impacts. An end surface of the guide shoes 40 opposite the surfaces on the side of the recesses 41 is in sliding contact with the guide surface 32a of the guiding projections 32.

Figure 5:
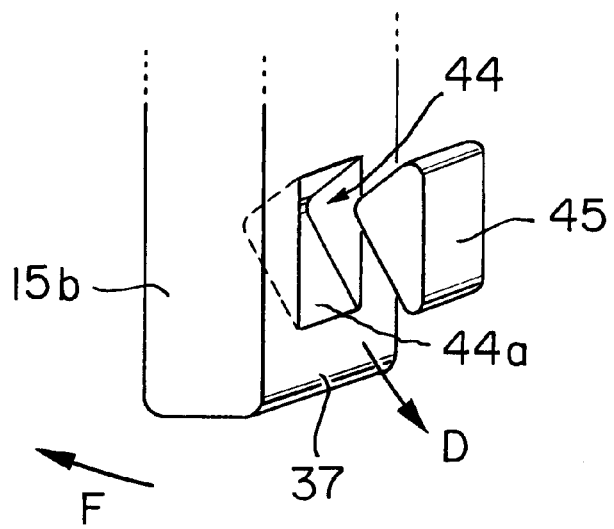
FIG. 5 is a schematic perspective of a spider arm with a wedge-shaped guide shoe removed from the spider arm.

As shown in FIG. 5, the wedge-shaped guide shoe 45 is put in a recess 44 having a wedge-shaped cross section and formed in the nonoperating side surface 37 of the arm 15b. The recess 44 has a bottom slope 44a having depth increasing radially inward. The wedge-shaped guide shoe 45 is able to slide along the bottom slope 44a in the direction of the arrow D.

Referring again to FIG. 3, the bottom slope 44a and a radially inner end surface 44b of the recess 44 are substantially perpendicular to each other. The inclination $\theta$ of the bottom slop 44a is substantially equal to the friction angle of a slope at which the guide shoe 45 starts sliding along the bottom slope 44a (an angle in the range of about 25° to about 35°). The wedge-shaped guide shoe 45 (right triangle) is similar in shape to the wedge-shaped recess 44. The wedge-shaped guide shoe 45 has a first surface 45a in sliding contact with the bottom slope 44a, a second surface 45b facing the end surface 44b of the recess 44, and a third surface 45c in sliding contact with the guide surface 32b. The angle between the first surface 45a and the second surface 45b is a right angle, the angle $\theta$ between the first surface 45a and the third surface 45c (which will be called "wedge angle $\theta$") is about equal to the friction angle (about 25° to about 35°).

A hole 48 is formed in the second surface 45b of the wedge-shaped guide shoe 45, and a weak auxiliary spring 49 is inserted in the hole 48 so as to be compressed between the bottom of the hole 48 and the end surface 44b of the recess 44. The auxiliary spring 49 biases the wedge-shaped guide shoe 45 in the direction of the arrow D along the bottom slope 44a.

As mentioned above, the wedge angle $\theta$ of the wedge-shaped guide shoe 45 is substantially equal to the friction angle. If the wedge angle $\theta$ is excessively small, pressure exerted by the third surface 45c on the guide surface 32b increases excessively when the driving sheave 3 rotates at a high rotating speed and centrifugal force acting on the wedge-shaped guide shoe 45 increases excessively and the axial sliding movement of the movable sheave part 11 becomes difficult. If the wedge angle $\theta$ is excessively large, the wedge effect of the wedge-shaped guide shoe 45 is insufficient. Consequently, when the movable sheave part 11 rebounds, i.e., when the movable sheave part 11 attempts to turn in the direction of the arrow F relative to the spider 15, the wedge-shaped guide shoe 45 is forced radially inward and the wedge effect of the wedge-shaped guide shoe 45 is liable to be nullified. When the wedge angle $\theta$ is approximately equal to the friction angle, the movable sheave part 11 can slide axially even if the centrifugal force increases and, even when the movable sheave part 11 rebounds, the wedge effect of the wedge-shaped guide shoe 45 will not be nullified.

In this embodiment, the wedge angle $\theta$ is about equal to 35°, which is the maximum friction angle the friction angle range of 25° to 35°, in expectation of the gradual increase of the friction angle with time due to the roughening of the guide surface 32b and the third surface 45c by dust and the like.

When the wedge angle $\theta$ is as large as the maximum friction angle of 35°, the wedge-shaped guide shoe 45 cannot be pressed against the guiding projection 32 by a sufficient pressure only by centrifugal force when the guide surface 32b and the third surface 45c are in the initial stage of use and are not roughened particularly while the prime mover is idling at a low engine speed. Therefore, the wedge-shaped guide shoe 45 is biased radially outward by a fixed low force at all times by the resilience of the auxiliary spring 49 to press the wedge-shaped guide shoe 45 against the guiding projection 32 by a pressure not lower than a fixed level so that a desired locking state can be maintained with a pressure exceeding a fixed level in the entire range of rotating speed. However, since it is possible that the sliding performance of the movable sheave part 11 is hindered if the pressure is excessively high, the pressure of the auxiliary spring 49 is on the order of, for example, 1.5 N.

The wedge-shaped guide shoe 45 and the cylindrical guide shoe 40 are made of a thermoplastic resin, such as polyamide resin or the like. The material of the wedge-shaped guide shoe 45 and the cylindrical guide shoe 40 is heat-resistant and abrasion-resistant and is capable of limiting the variation of coefficient of friction to a small extent and of maintaining sliding ability for a long period of use.

The construction of the driven sheave 4 will be explained briefly with reference to FIG. 1. The driven sheave 4 has a fixed sheave part 51 on the right side, as viewed in FIG. 1, and a movable sheave part 52 on the left side, as viewed in FIG. 1. A pressure applying mechanism includes a tubular shaft 53 screwed on the driven shaft 2, a roller supporting sleeve 54 axially movably fitted on the tubular shaft 53, a roller 55 held by the sleeve 54 so as to protrude inward, a ring 60 held at the left end of the tubular shaft 53, and a pressure applying spring 56 compressed between the ring 60 and the left end surface of the movable sheave part 52. The roller 55 is received in a straight or helical groove 59 formed in the tubular shaft 53.

The movable sheave part 52 is biased toward the fixed sheave part 51 by the pressure applying spring 56. The movable sheave part 52 can be moved away from the fixed sheave part 51 against the force of the pressure applying spring 56. The movable sheave part 52 is guided for axial movement by the roller 55 and the groove 59.

The V belt type automatic transmission is in a state shown in FIG. 1 while the prime mover is stopped, in which the flyweights 16 are turned radially inward, the movable sheave part 11 of the driving sheave 3 is moved rightward. As shown in FIG. 3, the wedge-shaped guide shoe 45 is biased in the direction of the arrow D by a low force of the auxiliary spring 49 and is pressed against the nonoperating guide surface 32b by a fixed pressure to eliminate a circumferential gap (backlash).

When the prime mover is started, the flyweight 16 shown in FIG. 1 is turned counterclockwise, as viewed in FIG. 1, by centrifugal force to move the movable sheave part 11 and the cover 21 toward the fixed heave part 10 to increase the effective diameter of the driving sheave 3.

Referring to FIG. 3, while the driving sheave 3 is in rotation, centrifugal force and the force of the auxiliary spring 49 acts radially outward on the wedge-shaped guide shoe 45 to push the wedge-shaped guide shoe 45 along the bottom slope 45a in the direction of the arrow D, so that the third surface 45c is pressed against the guide surface 32b of the guiding projection 32 by a fixed pressure and the backlash is kept at a naught. Therefore, even if the torque of the prime mover varies, the movable sheave part 11 and the spider 15 vibrate scarcely in circumferential directions relative to each other and any hammering noise will not be generated.

More concretely, in a normal operating state in which torque is transmitted from the spider 15 to the movable sheave part 11, the cylindrical guide shoe 40 on the operating surface is compressed between the side surface 36 of the spider 15 and the guide surface 32a, and the side surface 37 tends to separate in a circumferential direction from the guide surface 32b to form a circumferential gap. Then, the wedge-shaped guide shoe 45 is moved slightly along the bottom slope 44a in the direction of the arrow D by centrifugal force and the force of the auxiliary spring 49 to compensate for the circumferential gap. When the movable sheave part 11 is forced to move forward in the direction of the arrow F indicating a rotating direction relative to the spider 15 by the subsequent change of the torque, the movable sheave part 11 and the spider 15 are unable to vibrate in circumferential directions relative to each other and any hammering noise is not generated because the backlash is reduced substantially to a naught by the wedge-shaped guide shoe 45.

Other embodiments of the present invention will be described hereinafter.

(1) In FIG. 2, the two arms 15b respectively extending in opposite directions among the four arms 15b of the cross-shaped spider 15 are provided with the wedge-shaped guide shoes 45, respectively. However, one of the four arms 15b, the three of the four arms 15b or all the four arms 15b may be provided with wedge-shaped guide shoes, respectively.

(2) In FIG. 3, the wedge-shaped guide shoe 45 is placed on the side of the arm 15b on the circumferentially back side with respect to the direction F of rotation, i.e., on the side of the nonoperating surface, the wedge-shaped guide shoe 45 may be placed on the side of the operating surface through which the torque of the driving shaft is transmitted. Wedge-shaped guide shoes may be placed on the circumferentially opposite sides of the arm 15b.

Figure 6:
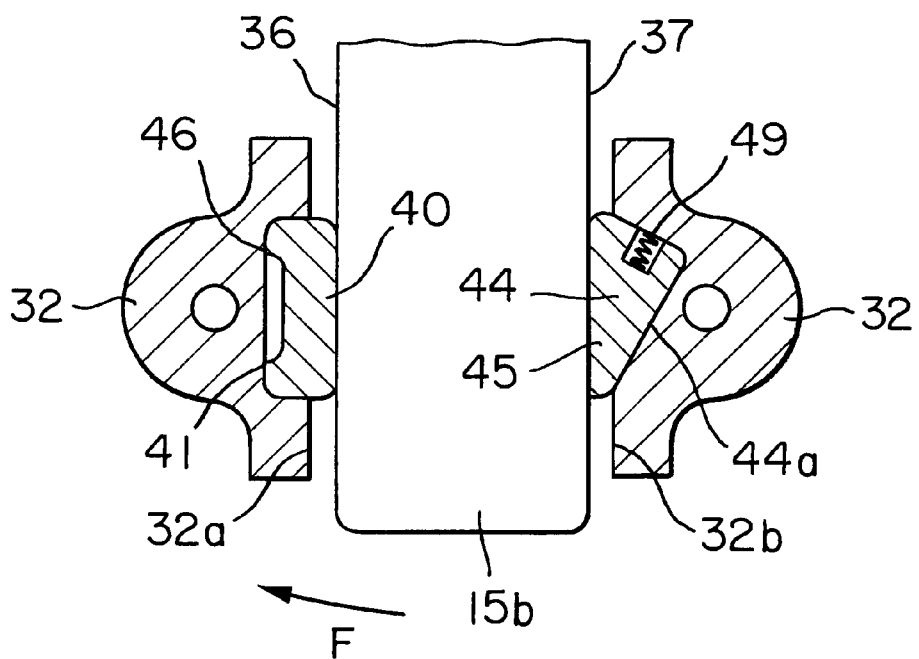
FIG. 6 is a sectional view similar to FIG. 4, showing a modification of a part of the V belt type automatic transmission of according to the present invention.

(3) As shown in FIG. 6, a wedge-shaped recess 44 may be formed in the guide surface 32b of the guiding projection 32 to hold the wedge-shaped guide shoe 45 by the guiding projection 32 so that the wedge-shaped guide shoe 45 is in sliding contact with the side surface 37 of the spider 15.

(4) Any suitable elastic member, such as an elastic member made of rubber or a plate spring, may be used as the auxiliary biasing means for biasing the wedge-shaped guide shoe 45 radially outward instead of the coil spring 49 as shown in FIG. 3.

(5) In FIG. 3, the auxiliary spring 49 expands and contracts in directions parallel to the bottom slope 44a and hence the auxiliary spring 49 will not bend even if the wedge-shaped guide shoe 45 moves. The auxiliary spring 49 may expand and contract in radial directions. In the foregoing embodiment, the angle between the bottom slope 44a and the end surface 44b of the recess 44 is 90°. However, the angle may be properly determined taking into consideration the angle of the auxiliary spring 49 and the like.

(6) Although the present invention is applicable to continuously-variable-speed transmissions used on various types of vehicles as mentioned previously, the present invention is suitable for application to all-terrain vehicles (the so called ATVs) which require frequent speed change. Naturally, the present invention is applicable to power transmitting mechanisms to be used in combination with equipment other than vehicles.

As is apparent from the foregoing description, the present invention exercises the following effects.

(1) In the V belt type automatic transmission, the wedge-shaped guide shoes 45 are interposed in circumferential gaps between the guiding projections 32 formed on the movable sheave part 11 of the driving sheave 3 and the arms 15b of the spider 15 fixed to the driving shaft 1 to transmit the torque of the prime mover to the movable sheave part 11, respectively, the guide shoes 45 are pushed radially outward by centrifugal force to reduce circumferential gaps (backlashes and the like) substantially to zero by their wedge effect, so that the generation of hammering noise attributable to backlashes can be prevented, the rate of abrasion of the bushings can be reduced and the axial sliding ability of the movable sheave part 11 relative to the spider 15 can be maintained.

(2) The spider 15 is provided with the wedge-shaped recesses 44 and the wedge-shaped guide shoes 45 are held in the recesses 44. The recesses 44 can be more easily seen from outside than recesses formed in the guiding projections of the movable sheave part 11, the wedge-shaped guide shoes 45 can be easily fitted in the recesses 44, the axial dimension of the wedge-shaped guide shoes 45 may be small, the guide shoes 45 are not twisted and the abilities of the guide shoes 45 to slide and to move radially can be maintained.

(3) Since the wedge-shaped guide shoe 45 is biased radially outward by the auxiliary biasing means, such as the auxiliary spring 49, the wedge effect of the wedge-shaped guide shoe 45 is effective and pressure of a fixed level or higher can be maintained even in a state where the driving pulley 3 is rotating at a low rotating speed and only a low centrifugal force is acting on the wedge-shaped guide shoe 45. Therefore, there is no possibility that the wedge-shaped guide shoe 45 becomes loose due to insufficient centrifugal force and the generation of hammering noise attributable to backlash can be prevented even in a state where the driving sheave 3 is rotating at a low rotating speed.

What is claimed is:

1. A V belt type automatic transmission comprising:
   a driving shaft;
   a driving sheave mounted on the driving shaft;
   a driven shaft;
   a driven sheave mounted on the driven shaft;
   a V belt wound around the driving sheave and the driven sheave; and
   a driving sheave thrusting mechanism for moving the driving sheave on the driving shaft;
   said driving sheave including a fixed sheave part mounted on the driving shaft and restrained from axial movement and rotation relative to the driving shaft, and a movable sheave part axially movably put on the driving shaft;
   said driving sheave thrusting mechanism including flyweights supported for turning on the movable sheave part, and a spider having parts in contact with the flyweights, fixedly mounted on the driving shaft, restrained from axial movement and rotation relative to the driving shaft and capable of transmitting torque of the driving shaft to the movable sheave part; and
   guide shoes being placed in circumferential gaps between the spider and engaging parts of the movable sheave part, respectively, to guide the movable sheave part for axial movement relative to the spider, and the guide shoes include a wedge-shaped guide shoe.

2. The V belt type automatic transmission according to claim 1, wherein the spider has a plurality of arms, the guide shoes are placed in circumferential gaps between the arms of the spider and the engaging parts of the movable sheave part, the wedge-shaped guide shoe is placed in the circumferential gap between one of the arms of the spider and the corresponding engaging part of the movable sheave part.

3. The V belt type automatic transmission according to claim 2, wherein the one of the wedge-shaped guide shoes is placed in the circumferential gap between the engaging parts of the arm of the spider and the movable sheave part.

4. The V belt type automatic transmission according to claim 1, wherein the guide shoes are disposed on the circumferentially opposite sides of each arm of the spider, and the wedge-shaped guide shoe is disposed on a back side of the arm of the spider with respect to a direction in which the driving shaft rotates.

5. The V belt type automatic transmission according to claim 1, wherein the wedge-shaped guide shoe has the shape of a wedge and is radially outwardly tapered.

6. The V belt type automatic transmission according to claim 1, wherein wedge-shaped guide shoe has a wedge angle substantially equal to a friction angle of the engaging part of the arm of the spider and the engaging part of the movable sheave part at which the wedge-shaped guide shoe starts sliding along the engaging parts.

7. The V belt type automatic transmission according to claim 1, wherein the wedge angle of the wedge-shaped guide shoe is in the range of about 25° to about 35°.

8. The V belt type automatic transmission according to claim 1, wherein a wedge-shaped recess is formed in each arm of the spider to hold the wedge-shaped guide shoe on the arm of the spider.

9. The V belt type automatic transmission according to claim 1 further comprising an auxiliary biasing means for radially outwardly biasing the wedge-shaped guide shoe.

10. The V belt type automatic transmission according to claim 9, wherein the auxiliary biasing means is a spring.

11. The V belt type automatic transmission according to claim 9, wherein the auxiliary biasing means exerts a force in the range of about 1 to about 2 N on the wedge-shaped guide shoe.

* * * * *